No. 12,338. REISSUED APR. 18, 1905.

G. CODY.

FRESH AIR INLET FOR SANITARY VENTILATION OF THE DRAINAGE SYSTEMS OF HOUSES, BUILDINGS, OR THE LIKE.

APPLICATION FILED AUG. 17, 1904.

WITNESSES:

William Miller

George Hulsberg

INVENTOR

George Cody

BY

W. C. Hauff

ATTORNEY

PHOTO-LITHOGRAPHED BY SACKETT & WILHELMS LITHO. & PT'G. CO. NEW YORK.

No. 12,338. Reissued April 18, 1905.

UNITED STATES PATENT OFFICE.

GEORGE CODY, OF FLUSHING, NEW YORK, ASSIGNOR OF ONE-HALF TO LOUIS MUNZINGER, OF NEW YORK, N. Y.

FRESH-AIR INLET FOR SANITARY VENTILATION OF THE DRAINAGE SYSTEMS OF HOUSES, BUILDINGS, OR THE LIKE.

SPECIFICATION forming part of Reissued Letters Patent No. 12,338, dated April 18, 1905.

Original No. 736,220, dated August 11, 1903. Application for reissue filed August 17, 1904. Serial No. 221,450.

*To all whom it may concern:*

Be it known that I, GEORGE CODY, a citizen of the United States, residing at Flushing, Queens county, New York, formerly of Manhattan borough, New York city, in the county of New York and State of New York, have invented new and useful Improvements in Fresh-Air Inlets for Sanitary Ventilation of the Drainage Systems of Houses, Buildings, or the Like, of which the following is a specification.

By means of this invention a valve or seal is provided which will insure satisfactory closure and operation and which is not liable to stick or become deranged, so as to interfere with the desired ventilation.

The invention is set forth in the following specification and claims and illustrated in the annexed drawings, in which—

Figure 1:
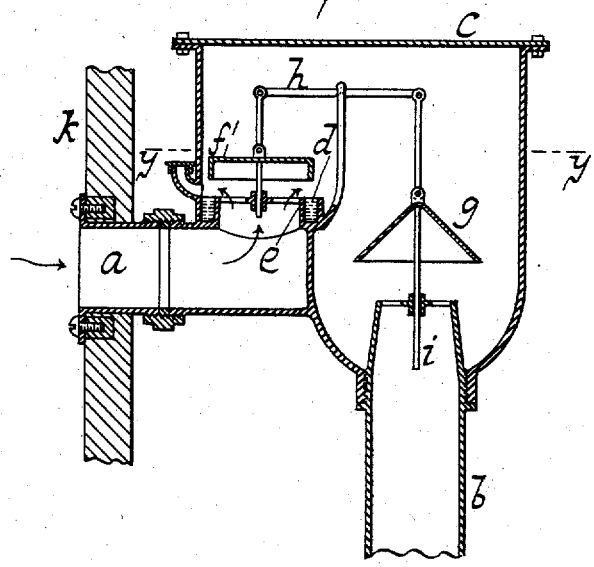
Figure 2:
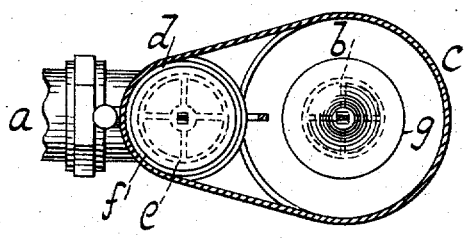

Figure 1 is a sectional side elevation of an inlet embodying this invention. Fig. 2 is a section along *y y*, Fig. 1.

In the drawings is shown an inlet-pipe *a* and what may be called a "spigot" end *b*, which leads to the house-drain. The device serves to admit fresh air into the drainage to permit circulation of fresh air through the entire system of soil, waste, and vent pipes and continuing up and through the roof of a building. A chamber *c* connects with the two pipes *a* and *b*. This chamber is provided with a non-evaporating sealing medium or liquid. Mercury or glycerin has been found to answer as sealing medium, as they are practically, if not entirely, non-evaporating and not liable to change, decomposition, or the like. The sealing medium is shown at *d* and can be contained in a trough or annular receptacle *e* for the reception of the edge or cup-shaped disk *f'*. When the liquid *d* surrounds the edge of disk *f'*, the seal is made. Separating the disk and liquid will break the seal. The movable cup-shaped disk *f'* acts as a valve, since when this disk is moved to seat *e* the passage is sealed or closed. On the disk moving clear of the seat the valve is opened. A hood *g* is adapted to be actuated by back pressure in the spigot-pipe *b* to close the seal. In order to effectively direct back pressure or cause the same to satisfactorily actuate the hood, the pipe *b* is shown tapered or arranged to cause the back pressure therefrom to impinge or strike on the hood. The hood is shown balanced or suspended from a scale-beam or knife-edge-supported lever *h*. The seal portion or disk *f'* is also suspended from this lever, so as to balance or nearly balance the hood. The hood, in addition to being suitably balanced, is also shown guided so that its movements are accurate or properly alined. A stem *i*, sliding or guided in a spider at pipe *b*, will act as a guide. The parts are normally in position or the seal open to allow fresh air to enter and pass up or out through pipe *b*, leading into the house-drainage pipes. In case of back pressure or air from pipe *b* wanting to escape through inlet *a* such back pressure will actuate the hood to close the seal. As the liquid seal does not cause any adherence or sticking of parts *e f'*, the seal will readily open and allow ventilation whenever relieved from back pressure.

The apparatus is set into the interior of the building or cellar, with the inlet-pipe *a* extending through the wall *k* to the exterior air. By having the apparatus set into the interior or cellar of a building it is secure against being tampered with from the outside.

What I claim as new, and desire to secure by Letters Patent, is—

1. An air-inlet pipe and a spigot-pipe combined with a chamber provided with a non-evaporating sealing medium or liquid, a sealing-disk made to coact with the liquid to form a valve, and a hood made to counterbalance the disk and placed at the spigot-pipe to receive back pressure so as to be actuated for closing the valve.

2. An air-inlet pipe and a spigot-pipe combined with a non-evaporating sealing medium or liquid, a lever fulcrumed between the inlet-pipe and the spigot, a sealing-disk and a hood suspended from opposite ends of the lever so as to come respectively over the inlet and spigot.

3. A chamber, an inlet-pipe and a spigot-pipe both made to open upwardly into the chamber, a sealing-disk and a hood made to balance one another and located respectively over the inlet and spigot so that on back pressure from the spigot the hood is actuated to close the disk.

4. An air-inlet pipe, a spigot-pipe, a hood and a sealing-disk, said hood and disk being made to balance one another so as to hold the parts normally in open or unsealing position, and said hood being made to receive back pressure from the spigot so as to bring the disk to sealing or closing position.

5. An air-inlet pipe extended through a house-wall to the outer air, a chamber made to communicate with the inlet and placed in the cellar of the house so as to be accessible from the interior and to be protected against interference from the exterior, a spigot-pipe made to communicate with the chamber, and a normally open sealing disk or valve and hood in the chamber, said hood being actuated by the back pressure from the spigot to close or move the disk or valve to the inlet.

6. An air-inlet pipe extended through a house-wall to the outer air, a chamber made to communicate with the inlet and placed in the cellar of the house so as to be accessible from the interior and to be protected against interference from the exterior and a spigot-pipe made to communicate with the chamber, and a valve inclosed in said chamber to be operated by the back pressure from the spigot-pipe.

In testimony whereof I have signed my name to this specification in the presence of two subscribing witnesses.

GEORGE CODY.

Witnesses:
CHAS. E. POENSGEN,
GEORGE HULSBERG.